(12) United States Patent
Genard

(10) Patent No.: US 9,406,970 B2
(45) Date of Patent: Aug. 2, 2016

(54) METHOD FOR FORMING A LITHIUM-ION TYPE BATTERY

(71) Applicant: STMicroelectronics (Tours) SAS, Tours (FR)

(72) Inventor: Dominique Genard, Pernay (FR)

(73) Assignee: STMICROELECTRONICS (TOURS) SAS, Tours (FR)

( * ) Notice: Subject to any disclaimer, the term of this patent is extended or adjusted under 35 U.S.C. 154(b) by 165 days.

(21) Appl. No.: 13/957,518

(22) Filed: Aug. 2, 2013

(65) Prior Publication Data
US 2014/0038028 A1 Feb. 6, 2014

(30) Foreign Application Priority Data
Aug. 3, 2012 (FR) ...................................... 12 57588

(51) Int. Cl.
*H01M 10/04* (2006.01)
*H01M 10/0525* (2010.01)
*H01M 10/0585* (2010.01)
*H01M 4/04* (2006.01)

(52) U.S. Cl.
CPC ...... *H01M 10/0436* (2013.01); *H01M 10/0525* (2013.01); *H01M 4/0423* (2013.01); *H01M 10/0585* (2013.01); *Y02E 60/122* (2013.01); *Y02P 70/54* (2015.11)

(58) Field of Classification Search
CPC ..... H01M 2/14; H01M 10/04; H01M 12/006; H01M 10/0436; H01M 10/0525; H01M 4/0423; H01M 10/0585
See application file for complete search history.

(56) References Cited

U.S. PATENT DOCUMENTS

| 6,168,884 | B1 * | 1/2001 | Neudecker et al. ............ 429/162 |
| 6,562,461 | B1 * | 5/2003 | Clough ......................... 428/403 |
| 2001/0054226 | A1 * | 12/2001 | Yoshimura et al. .......... 29/623.5 |
| 2002/0125822 | A1 * | 9/2002 | Graff .................. H01L 51/5256 313/506 |
| 2003/0118897 | A1 * | 6/2003 | Mino et al. ..................... 429/149 |
| 2003/0124050 | A1 * | 7/2003 | Yadav ..................... A62C 31/03 423/592.1 |
| 2003/0232248 | A1 * | 12/2003 | Iwamoto et al. .............. 429/233 |
| 2004/0268396 | A1 | 12/2004 | Busson et al. |
| 2005/0001214 | A1 * | 1/2005 | Brun ..................... G06K 19/073 257/59 |
| 2010/0202566 | A1 | 8/2010 | Fudge et al. |
| 2011/0070480 | A1 * | 3/2011 | Hahn .................. H01M 2/0207 429/162 |
| 2011/0076567 | A1 | 3/2011 | Bouillon |

FOREIGN PATENT DOCUMENTS

| EP | 0681364 A1 | 11/1995 |
| FR | 2950741 A1 | 4/2011 |

OTHER PUBLICATIONS

French Search Report and Written Opinion dated Apr. 19, 2013 from corresponding French Application No. 12/57588.

* cited by examiner

*Primary Examiner* — Sarah A Slifka
*Assistant Examiner* — Brian Ohara
(74) *Attorney, Agent, or Firm* — Allen, Dyer, Doppelt, Milbrath & Gilchrist, P.A.

(57) ABSTRACT

A method for manufacturing a lithium-ion type battery including the steps of forming in a substrate a recess having lateral walls having a re-entrant profile; depositing, by successive non-conformal physical vapor depositions, a stack of the different layers forming a lithium-ion battery, this stack having a thickness smaller than the depth of the recess; depositing on the structure a filling layer filling the space remaining in the recess; and planarizing the structure to expose the upper surface of the stack.

9 Claims, 3 Drawing Sheets

METHOD FOR FORMING A LITHIUM-ION TYPE BATTERY

CROSS REFERENCE TO RELATED APPLICATIONS

This application claims the priority benefit of French patent application serial number 12/57588, filed on Aug. 3, 2012, which is hereby incorporated by reference to the maximum extent allowable by law.

BACKGROUND

1. Technical Field

The present disclosure relates to a method for forming a vertical thin-film lithium-ion type battery.

2. Discussion of the Related Art

Lithium-ion type batteries have the advantage of comprising a solid non-flammable electrolyte which further has a good ion conductivity over a wide range of temperatures. Such batteries could advantageously be used in mobile electronic devices such as portable phones or computers.

To form thin-film lithium-ion batteries, typically batteries having 2.5×2.5-cm$^2$ dimensions, the use of techniques of sputtering through a shadow mask is known. Such techniques comprise placing a shadow mask above a support and sputtering, through this mask, the different layers forming the battery.

However, for a large-scale production of thin-film lithium-ion type batteries, the use of shadow masks may necessitate a relatively high cost. Indeed, for each sputtering using a mask, the sputtered component also deposits on the mask. Thus, between each use of the mask, it is necessary to remove and to recycle the different layers deposited on this mask.

Techniques for forming batteries by sputtering through a shadow mask also have the advantage of not being adapted to form batteries having smaller dimensions (with a side length smaller than 3 mm), mask alignment problems appearing for such dimensions. Now, such batteries could advantageously be used as backup batteries to save key data in memories in case of a failure of a main battery.

To form small lithium-ion type batteries, it could be devised to adapt lithography techniques which are well known and controlled in the field of integrated circuits. However, such techniques entail relatively high costs if they are applied to large substrate surface areas. Further, lithography methods require the use of resins which are removed by wet processings (generally solvent-based aqueous mixtures) which would cause chemical reactions with the very reactive lithium-based layers of the battery. Such techniques are thus complex to implement for the manufacturing of lithium-ion type batteries.

FIG. 1 corresponds to FIG. 4 of published U.S. patent application No. US-2011-0076567-A1 of the applicant illustrating a lithium-ion type battery structure at an intermediary step of its manufacturing.

The structure comprises a conductive substrate 10 having an insulating material layer 12 formed thereon. As an example, substrate 10 may have a thickness ranging between 500 and 800 µm and may be made of doped silicon or again of a metal. Insulating layer 12 may be made of silicon oxide and have a thickness ranging between 5 and 30 µm.

A stack of the different layers forming a lithium-ion type battery is deposited in an opening formed in layer 12. This stack comprises the following layers:

a first layer 18 forming a cathode collector; this layer may be made of titanium, of tungsten, of molybdenum, of tantalum, of platinum, or of an alloy or a stack of these materials and have a thickness ranging between 100 and 500 nm;

a second layer 20 forming the battery cathode, made of a material such as LiTiOS (lithium titanium oxysulphide), LiCoO$_2$ (cobalt and lithium oxide), or LiFePO$_4$ (iron and lithium phosphate), having a thickness ranging between 1 and 10 µm; more generally, layer 20 may be made of any lithium insertion material usable as a cathode in lithium-ion type batteries;

a third layer 22 forming the electrolyte of the battery, for example, formed of LiPON (Lithium Phosphorus Oxynitride) or of any material capable of forming a solid lithium-ion battery electrolyte; third layer 22 has a thickness ranging between 1 and 3 µm;

a fourth layer 24 forming the battery anode, for example, made of silicon, germanium, carbon, or of a stack or an alloy of these materials; the fourth layer has a thickness ranging between 10 and 800 nm;

a fifth layer 26 forming an anode collector or a seed layer for the anode collector; this layer may be formed of a stack of titanium and copper; layer 26 may have a thickness ranging between 100 and 300 nm; it is possible not to provide layer 26 if the material forming the anode collector layer is capable of being directly formed on the battery anode.

Thus, the stack of layers 18 to 26 forming the active portion of the lithium-ion type battery may have a thickness ranging between 5 and 15 µm.

To achieve the structure of FIG. 1, successive conformal depositions have been performed, after which a planarization or polishing has been performed to remove all the layers located above the upper surface of the portions of insulating material 12 and thus expose this insulating material. The planarization is performed by chem.-mech. polishing (CMP). It should however be ascertained to use non-aqueous planarization compounds which do not react with the materials of layers 20 and 22. This planarization step may be particularly difficult to implement.

Thus, there is a need for a method enabling to form thin-film lithium-ion type batteries, this method being relatively inexpensive to implement and adapted to the presence of the very reactive materials forming these batteries.

SUMMARY

An embodiment provides a method for manufacturing a lithium-ion type battery comprising the steps of:

(a) forming in a substrate a recess having lateral walls with a re-entrant profile;

(b) depositing, by successive non-conformal physical vapor depositions, a stack of the different layers forming a lithium-ion type battery, this stack having a thickness smaller than the depth of the recess;

(c) depositing on the structure a filling layer filling the space remaining in the recess; and (d) planarizing the structure to expose the upper surface of the stack.

According to an embodiment, the substrate is made of silicon, uniformly coated with an insulating layer after the recess has been formed.

According to an embodiment, the stack comprises at least a cathode collector layer, a cathode layer, an electrolyte layer, an anode layer, and an anode collector layer, in this order or in the reverse order.

According to an embodiment, the substrate is made of doped silicon or of metal, the cathode collector layer is made of titanium, of tungsten, of molybdenum, of tantalum, of platinum, of aluminum, or of copper, or of an alloy or a stack of these materials, the cathode layer is made of lithium titanium oxysulphide (LiTiOS), of lithium cobalt oxide ($LiCoO_2$), of vanadium oxide ($V_2O_x$), or of any material capable of inserting lithium, the electrolyte layer is made of lithium phosphorus oxynitride (LiPON), of LiSON, or of LiSiPON, the anode layer is made of silicon, of germanium, of carbon, of metal Li, of TiOx, or of a stack or an alloy of these materials and the anode collector layer is made of copper or of aluminum.

According to an embodiment, the cathode collector layer has a thickness ranging between 100 and 500 nm, the cathode layer has a thickness ranging between 1 and 10 μm, the electrolyte layer has a thickness ranging between 1 and 3 μm, and the anode layer has a thickness ranging between 10 and 800 nm.

An embodiment provides an assembly of a pair of batteries obtained by the above method, wherein a first battery is assembled head-to-tail with a second battery, each of the batteries being used as a protection cap for the other.

According to an embodiment, the layer deposition order is reversed between the first and second batteries.

According to an embodiment, the connection with the back side of each battery is provided by a via crossing the substrate of this battery.

The foregoing and other features and advantages will be discussed in detail in the following non-limiting description of specific embodiments in connection with the accompanying drawings.

BRIEF DESCRIPTION OF THE DRAWINGS

For clarity, the same elements have been designated with the same reference numerals in the various drawings and, further, as usual in the representation of thin layer components of small dimensions, the various drawings are not to scale.

DETAILED DESCRIPTION

FIGS. 2 to 6 illustrate results of successive steps of an embodiment of a method for forming a thin-film lithium-ion battery formed in a substrate 30. This method especially adapts to the case where a battery of small dimensions (with a side length ranging from 1 to 5 mm) is desired to be formed. It is then currently spoken of a micro-battery. The following description will be made in the specific case where the substrate is a silicon substrate, but any other substrate may be used, for example, a substrate made of an insulating material. The use of a silicon substrate however corresponds to a preferred embodiment since tried and tested techniques are known to saw, etch, and process such substrates. This further enables forming microelectronic components in the same substrate, on the same surface, or on a surface opposite to that on which the battery or batteries are formed.

Figure 2:
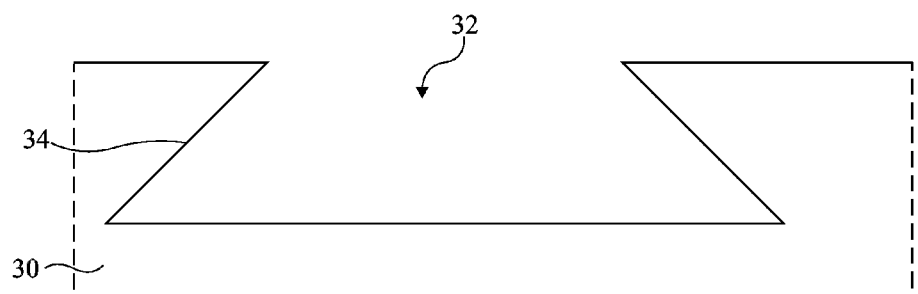
FIGS. 2 to 6 illustrate results of successive steps of an embodiment of a method for forming a thin-film lithium-ion type battery.

In a first step illustrated in FIG. 2, a recess 32 with a re-entrant profile having an opening narrowed with respect to its largest lateral dimension is formed in a substrate 30. Lateral walls 34 may be concave. In the illustrated example, walls 34 are substantially planar and diverge from the upper surface of the substrate. Various methods are known, according to the substrate type, to obtain this recess shape. For silicon, a cryogenic etching may for example be performed while the substrate is cooled down to a temperature on the order of −100° C. in the presence of a plasma of $SF_6$ and oxygen.

Figure 3:
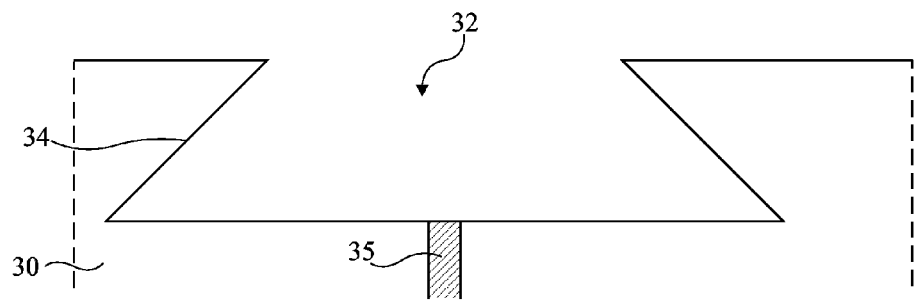

At the step illustrated in FIG. 3, a conductive via 35, which crosses the entire substrate and which extends from the bottom of recess 32 to the opposite surface of the substrate, has been formed. Many techniques are known to form such vias, possibly with insulated walls, and such techniques will not be described any further herein. Although a single via has been shown, it should be understood that several vias crossing the substrate may be formed simultaneously, as will be described hereinafter. Further, this via-forming step has been shown immediately after the forming of the recess. It should be understood from the final structure that these vias may be formed at another stage of the manufacturing.

Figure 4:
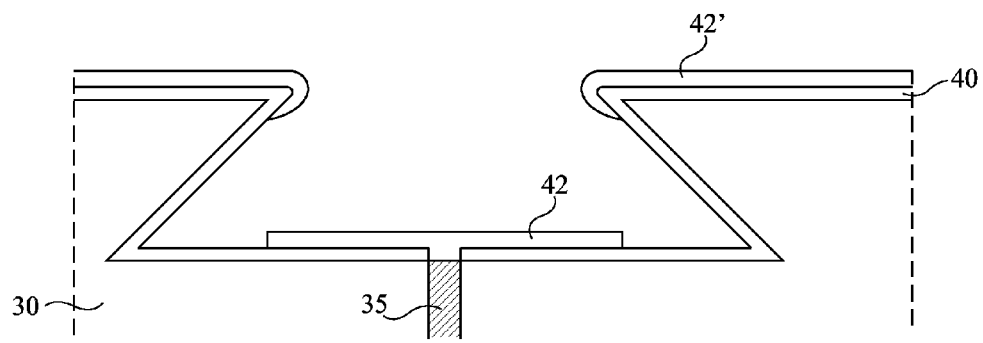

FIG. 4 illustrates the result of other steps. An insulating layer 40 has been formed on the walls and the bottom of recess 32, as well as on the upper surface of the substrate. This insulating layer results from a conformal deposition, so that it deposits substantially with the same thickness on the lateral walls and the bottom of the recess and on the non-recessed portions of the substrate. Silicon nitride may for example have been deposited by a low pressure chemical vapor deposition method (LPCVD), or aluminum oxide may have been deposited by a chemical vapor deposition method (CVD), or by an atomic layer deposition method (ALD). Insulating layer 40 may for example have a thickness ranging between 0.5 and 2 μm. Insulating layer 40 is opened in front of via 35.

A first layer 42 constitutive of the battery, that is, a cathode (or anode) collector conductive layer is then deposited by a physical vapor deposition (PVD) method. The use of such a method results in that layer 42 deposits at the bottom of the recess, substantially along the contour of the upper opening of recess 32. Simultaneously, a portion 42' of this layer deposits on the upper surface of the substrate and around the edge of the recess.

Thus, this deposition is performed with no masking, the "mask" being formed by the shape of the recess walls.

Figure 5:
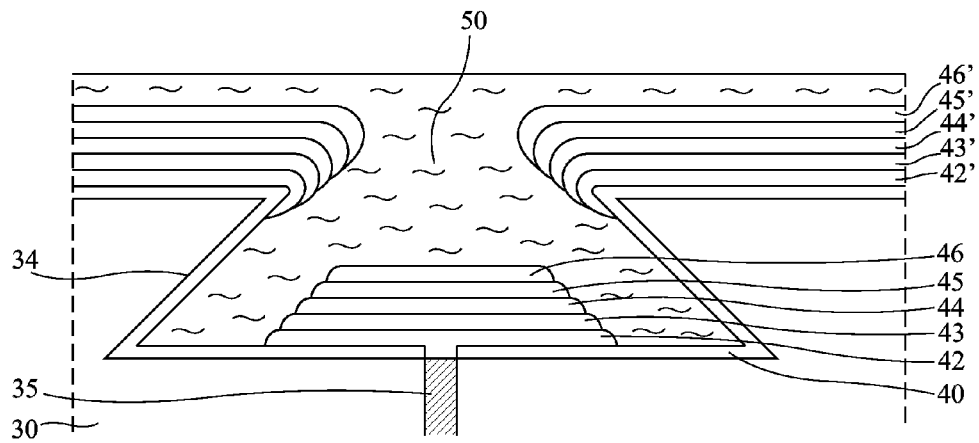

At the next steps, having their result illustrated in FIG. 5, all the layers 43 to 46 constitutive of the battery are successively deposited, also by non-conformal physical vapor deposition methods.

As shown in FIG. 5, each of layers 43 to 46 is masked by the increasingly narrow contour of the opening. Thus, each layer has a perimeter slightly smaller than that of the layer supporting it. Indeed, each layer deposits not only at the bottom of the recess, but also on the upper surface of the substrate and around the edge of the recess, which contributes to slightly narrowing the contour of the upper opening of recess 32 after each deposition. The depositions on the upper surface of the substrate are designated with reference numerals 42' to 46'.

After this, the remainder of the recess of an insulating material 50, which is neutral with respect to the various layers forming the battery, is filled. It may for example be a polymer such as polybenzoxazole (PBO), benzocylobutene (BCB), Alx, polyvinylidene chloride (PVDC).

As shown in FIG. 5, the depth of the recess will have been selected to be greater than the total thickness of layers 40 to 46. The recess will for example have a depth greater by from 10 to 20 μm than the thickness of the battery stack. If this stack has a thickness approximately ranging between 5 and 40 μm, the depth of the recess will be selected to approximately range between 15 and 60 μm. It should be noted that such depths are totally compatible with conventional silicon etch techniques.

Figure 1:
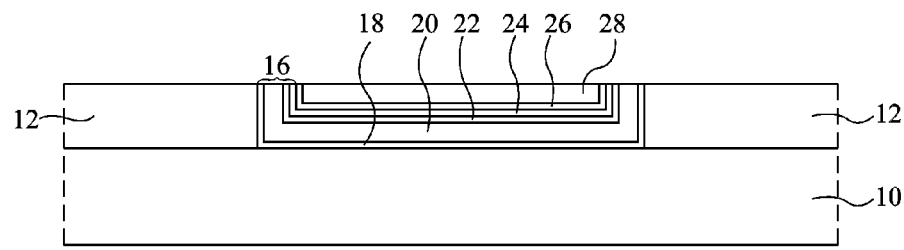
FIG. 1, previously described, corresponds to FIG. 4 of French patent application 09/56676 of the applicant.
Figure 6:
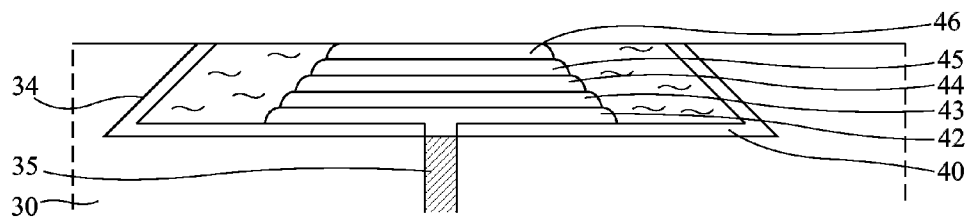

At the step illustrated in FIG. 6, the structure has been trimmed level, for example, by chem.-mech. polishing, to reach upper layer 46. According to an advantage of the method described herein, during this chem.-mech. polishing step, the etch compound will never be in contact with the critical layers of the stack forming the battery. Indeed, the polishing stops when upper layer 46, which is a conductive layer, for example, metallic, is reached. There are thus no strict constraints imposed to this polishing operation, unlike what can be observed in the method described in relation with FIG. 1.

Once the base structure illustrated in FIG. 6 has been formed, it should be protected and connected. Indeed, the active layers of a lithium-ion battery are particularly sensitive to oxygen, to water vapor, and to many other contaminants. One of the most effective protection modes is to cover the structure with a cap.

Figure 7:
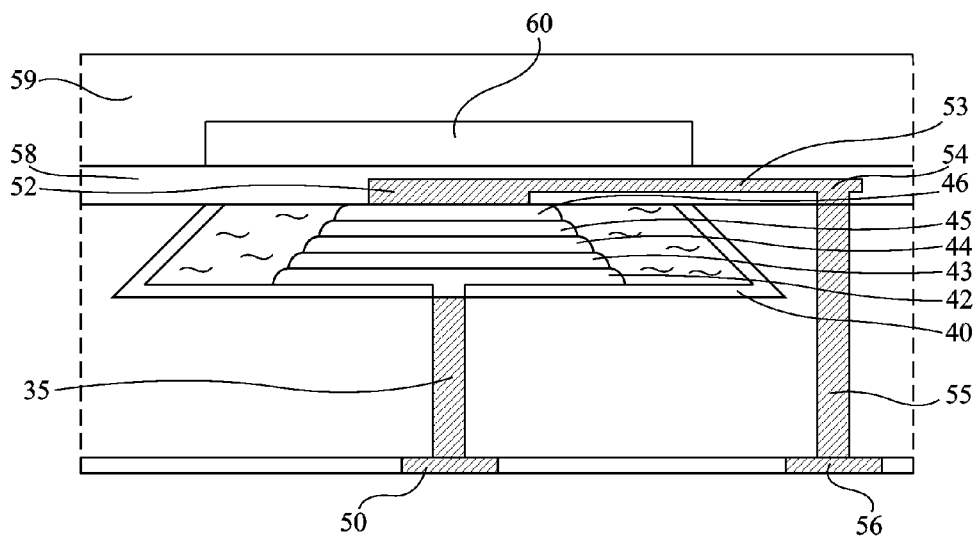
FIG. 7 illustrates an example of assembly of a battery of the previously-described type.

FIG. 7 shows a structure of the type in FIG. 6 provided with its connections and covered with a cap. Via 35 of connection to lower conductive layer 42 of the stack is connected on the rear surface side of the substrate to a pad 50 which may be a wire solder area, a ball mount area, or a conductive pillar, or any other conventional connection means.

On the front or upper surface side, a metallization 52 is in contact with upper conductive layer 46 of the stack. This metallization extends, in the shown example, via a metallization 53, towards an area 54 of contact with a second via 55 connected to a conductive pad 56 arranged on the rear surface side of the substrate. The upper surface is totally coated with an insulating layer 58 supporting a cap 59 preferably comprising a recess 60 opposite to the active portion of the battery. The cap is attached by any known means, for example, by molecular bonding, or more simply by a glue. Cap 59 is for example made of silicon.

Of course, the embodiment of FIG. 7 is an example only of cap assembly and of connection. Instead of providing two connections 50, 56 on the rear surface side of the battery substrate, it is possible to only provide pad 50 on the rear surface side and another pad solid with metallization 53 on the front surface next to the cap (not shown).

Figure 8:
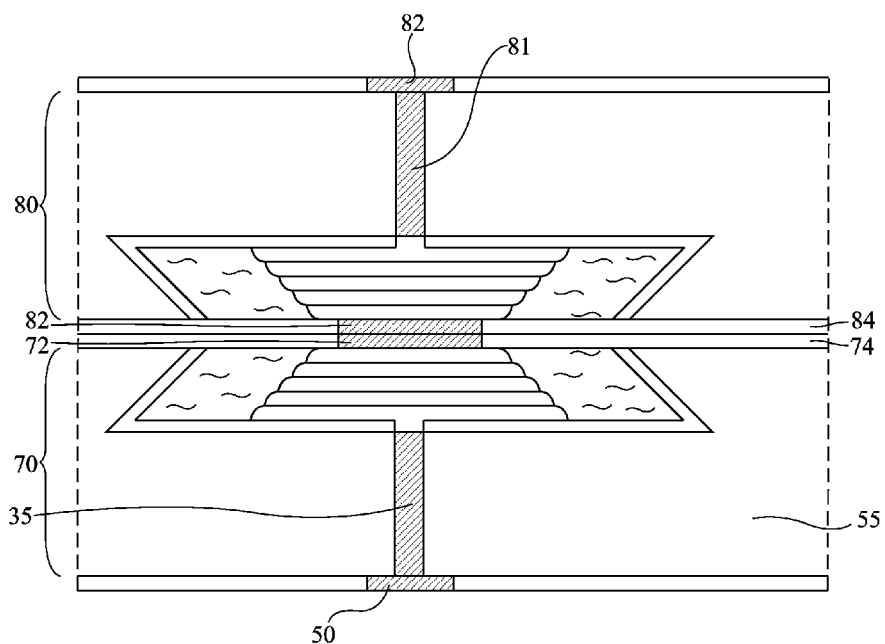
FIG. 8 shows an example of assembly of two batteries of the previously-described type.

FIG. 8 shows a specific embodiment of protection of a battery with a cap. In this case, two batteries placed face-to-face against each other are used, each being used as a cap for the other. The first battery, designated with reference numeral 70, and a second battery 80 are placed face-to-face against each other, as shown. In the shown example, the order of deposition of the layers is inverted for the two batteries, that is, the anode of one of them is connected to the cathode of the other. In this case, it is enough to form a first via 35 towards a pad 50 for battery 70 in the same way as it has been described in relation with FIG. 7 and a second via 81 towards a pad 82 for upper battery 80. An assembly having a first terminal, for example, the anode, corresponding to pad 50 and having its second terminal, for example, the cathode, corresponding to pad 82, is available.

In this case, the connection between the cathode of a battery and the anode of the other battery is achieved by metal areas 72 and 82 arranged in front of each other and respectively in contact with the anode collector layer and the cathode collector layer of the corresponding battery. Areas 72 and 82 will preferably be surrounded with respective insulating layers 74 and 84. The assembly may be formed by gluing or by any other means.

Of course, instead of connecting the two batteries in series as described in relation with FIG. 8, the two batteries may be connected in parallel by using, in each of the opposite batteries, connections of the type shown in FIG. 7.

In the drawings, a single elementary cell forming a lithium-ion type battery is shown. It should be understood that many batteries may be formed simultaneously next to one another on a same substrate. As an example, the active regions of two adjacent batteries may be separated by a distance smaller than 1 mm, for example, ranging between 200 and 500 μm. It should be noted that the sawing path between elementary batteries may be shorter than 100 μm.

Further, the materials used for the forming of the active battery stack may be different from those mentioned hereabove. They may comprise any known material enabling the forming of thin layer lithium-ion type batteries. As an additional example, layers 42 to 46 may comprise, in addition to the examples given for layers 18 to 26 described in relation with FIG. 1, the following materials:

for cathode collector 42, aluminum or copper, and the thickness may range between 0.5 and 5 μm;

for cathode 43, vanadium oxide, $V_2O_3$, and the thickness may range between 0.5 and 10 μm;

for electrolyte 44, LiSON or LiSiPON, and the thickness may range between 0.5 and 3 μm;

for anode 45, metallic Li or $TiO_x$, and the thickness may range between 0.2 and 2 μm;

for anode collector 46, aluminum, and the thickness may range between 0.5 and 1 μm.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for manufacturing a lithium-ion type battery comprising:

forming in a substrate a recess having lateral walls having an opening narrowed with respect to its largest lateral dimension;

depositing without using a shadow mask, by successive non-conformal physical vapor depositions, a stack of different layers forming the lithium-ion type battery, the stack having a thickness smaller than a depth of the recess;

depositing a filling layer filling a space remaining in the recess; and planarizing to expose an upper surface of the stack.

2. The method of claim 1, wherein the substrate comprises silicon, uniformly coated with an insulating layer after the forming of the recess.

3. The method of claim 1, wherein the stack comprises at least a cathode collector layer, a cathode layer, an electrolyte layer, an anode layer, and an anode collector layer.

4. The method of claim 3, wherein the substrate comprises doped silicon or metal, the cathode collector layer comprises titanium, tungsten, molybdenum, tantalum, platinum, aluminum, copper, or any combination thereof, the cathode layer comprises lithium titanium oxysulphide, lithium cobalt oxide, vanadium oxide, or any material having lithium, the electrolyte layer comprises lithium phosphorus oxynitride, LiSON, LiSiPON, the anode layer comprises silicon, germanium, carbon, metal Li, TiOx, or any combination thereof, and the anode collector layer comprises copper or aluminum.

5. The method of claim 1, wherein the cathode collector layer has a thickness ranging between 100 and 500 nm, the cathode layer comprises a thickness between 1 and 10 μm, the electrolyte layer has a thickness between 1 and 3 μm, and the anode layer has a thickness between 10 and 800 nm.

6. A method for manufacturing a lithium-ion type battery comprising:
- forming in a substrate a recess having lateral walls that diverge from an upper surface of the substrate to define a narrowed opening;
- forming, without using a shadow mask, a stack of different layers defining the lithium-ion type battery;
- forming a filling layer over the stack in the recess to form a structure; and
- planarizing the structure to expose an upper surface of the stack.

7. The method of claim 6, wherein the lateral walls are planar.

8. The method of claim 6, wherein the lateral walls are inclined.

9. The method of claim 6, wherein the stack comprises a cathode collector layer, a cathode layer, an electrolyte layer, an anode layer, and an anode collector layer.

* * * * *